United States Patent [19]

Silver

[11] 4,120,933
[45] Oct. 17, 1978

[54] DECONTAMINATION OF PLUTONIUM FROM WATER WITH CHITIN

[75] Inventor: Gary L. Silver, Centerville, Ohio

[73] Assignee: The United States of America as represented by the Unites States Department of Energy, Washington, D.C.

[21] Appl. No.: 837,251

[22] Filed: Sep. 27, 1977

[51] Int. Cl.$^2$ ............................................. C01G 56/00
[52] U.S. Cl. ................................ 423/6; 252/301.1 W; 423/251
[58] Field of Search ........................... 423/6, 7, 2, 251; 252/301.1 W

[56] References Cited

U.S. PATENT DOCUMENTS 3,763,049  10/1973  Gerber ...................................... 423/7
3,791,981  2/1974   Calmon ........................ 252/301.1 W

OTHER PUBLICATIONS

Glowacka et al., Nucl. Sci. Abs., 22, abs., No. 37852, (1968).
Muzzarelli et al., Chem. Abs., 72, abs. No. 74336, (1970).

Primary Examiner—Edward A. Miller
Attorney, Agent, or Firm—Dean E. Carlson; Dudley W. King; Robert Southworth, III

[57] ABSTRACT

The invention relates to a process for decontaminating or removing radionuclides from aqueous solution.

1 Claim, 1 Drawing Figure

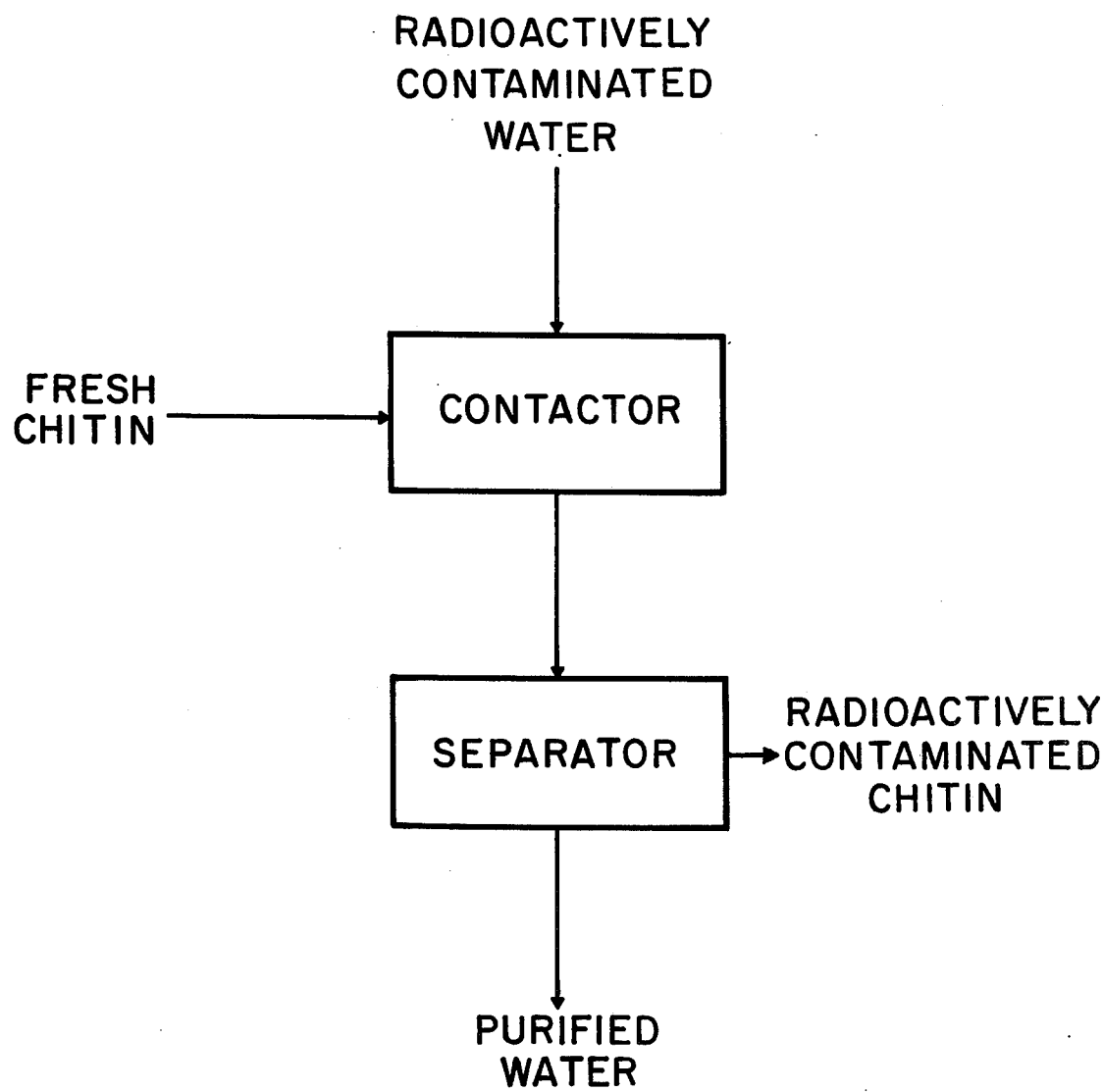

DECONTAMINATION OF PLUTONIUM FROM WATER WITH CHITIN

BACKGROUND OF THE INVENTION

Major problems encountered in the nuclear industry may include the normal or accidental and unintentional generation of large volumes of liquid waste containing biologically hazardous radionuclides. A very small quantity of radionuclide present may necessitate a very expensive decontamination or removal procedure. Some radionuclides are particularly hazardous because of their long physical or biological half lives. Other radionuclides are particularly hazardous because they may be concentrated by living organisms within a food chain.

SUMMARY OF THE INVENTION

In order to overcome the foregoing problems and drawbacks, it is an object of this invention to provide an improved, relatively simple, and economical process for removing radionuclides from aqueous solution.

It is another object of this invention to provide a process for removing those radionuclides from aqueous solution which may have an affinity for the tissues of living organisms.

It is a further object of this invention to provide a process for removing those radionuclides from aqueous solution which may be biologically hazardous due to a long physical or biological half life.

It is a still further object of this invention to provide a process for removing those radionuclides from aqueous solution which are biologically hazardous because they may be concentrated in a food chain.

The invention comprises contacting an aqueous solution containing a radionuclide with chitin until a portion of the radionuclide is absorbed by or otherwise associated with the chitin and thereafter separating the chitin from the aqueous solution.

DESCRIPTION OF DRAWING

The FIGURE is a flowsheet of the method of this invention.

DETAILED DESCRIPTION OF A PREFERRED EMBODIMENT

Referring now to the drawing which illustrates the process, it is seen that contaminated water is brought into contact with fresh chitin in a contactor and subsequently separated, giving a purified water product and a contaminated chitin product.

The radioactively contaminated water may be any of the aqueous waste streams generated in the nuclear industry, whether from mining, milling, enrichment, fuel fabrication, nuclear reactors, fuel reprocessing, or waste storage. These waste streams may contain radionuclides or actinides and fission products in either acidic, neutral, or basic media. Of particular importance are those radionuclides which are biologically active and are therefor concentrated in living tissue and in food chains.

Plutonium is a radionuclide of special importance because of the high degree of hazard reported for this element. Other members of the actinide series of elements of the Mendeleev Periodic Table would be expected to exhibit similar chemical behavior and thus would find similar applicability with the method of this invention.

Chitin is the principal ingredient of the shells of certain crustacea and insects. It is a polysaccharide, long chain, unbranched polymer of N-acetyl-2-amino-2-deoxy-$\beta$-D-glucopyranose units. Structurally, chitin is an analogue of cellulose wherein the hydroxyl groups on the C-2 carbon have been replaced by acetylamino or amino groups. Chitin does not occur in its pure form in nature but is usually associated with substantial quantities of protein and inorganic salts such as calcium carbonate. These impurities may be removed through a series of mild chemical separations resulting in a solid, flake, white to off-white product of about 99% purity. Chitin is commercially available from various sources, e.g., Hercules Incorporated of Wilmington, Delaware. It should be noted that chitin is normally found in association with living organisms and would be expected to exhibit altered characteristics when removed from the ambit of biological processes.

Chitin may be used to decontaminate or extract radionuclides from aqueous solutions using any of the solid liquid contacting unit operations well known in the art. One of the simplest of these is batch equilibration and is illustrated in the example. Those skilled in the art will recognize that other means of contacting and separating may produce higher levels of decontamination. These methods include multistage mixing-settling and counter current or stationary column operation. The purified aqueous stream and the contaminated chitin may be separated by well known gravity separation or filtration techniques.

In the solvent extraction or ion exchange arts the concept of a distribution coefficient is well known. This coefficient is similar to the concept of a decontamination factor or of an equilibrium coefficient and may be expressed as the amount of species in the solid phase divided by the amount of species in the liquid phase. All radionuclides, after equilibration, would exhibit a characteristic distribution between the solid phase (chitin) and the liquid phase (aqueous solution). With properly designed equipment containing enough theoretical stages, any radionuclide should be removable from an aqueous solution by contacting with chitin. Of course those radionuclides exhibiting a higher distribution coefficient with chitin will be more easily removed than those with a lower coefficient.

The radioactive contaminants, once absorbed or otherwise associated with the chitin may either be disposed of in a repository for radioactive waste or be recovered for reuse. Such subsequent recovery may include dissolution in a strong mineral acid or incineration followed by other recovery steps well known in the nuclear industry. It will be appreciated that chitin, which in its pure form contains only carbon, hydrogen, nitrogen, and oxygen, may be virtually ashless and particularly well suited radionuclide recovery without adding unnecessarily to the mass of radioactively contaminated material which must be stored in waste repositories.

EXAMPLE

Into several 100 ml flasks were placed equal samples of hexavalent plutonium of such amount that when diluted to the volumetric mark, the samples contained 13,000 disintegrations per minute per milliliter of solution. Into each flask was weighed 387 ± 5 mg of chitin in comminuted or flake form. The flasks were irregular white flakes having a surface area from about 1 to 10 square millimeters on each side. Equal volumes of sodium acetate/ammonium nitrate buffer solutions of various pHs were added to each flask and the solutions were diluted to 100 ml with distilled water. After standing with frequent shaking at substantially atmospheric pressure and room temperature for one week, an aliquot of liquid was withdrawn from each flask and counted in a liquid scintillation counter.

As can be seen from Table I, the chitin was effective in removing from 5/6 to 15/16 of the initial radioactivity.

TABLE I

| Flask # | pH | Radioactivity |
|---|---|---|
| original | NA | 13,000 d/min/ml |
| 1 | 4.94 | 810 |
| 2 | 6.65 | 1,125 |
| 3 | 8.10 | 2,363 |
| 4 | 8.65 | 2,163 |
| 5 | 9.30 | 1,874 |
| 6 | 9.75 | 2,192 |
| 7 | 10.24 | 2,380 |

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A process for removing at least an 80% portion of plutonium from an aqueous solution containing said plutonium comprising; adding to said aqueous solution a buffer solution to provide a pH in the range of about 5 to about 10, thereafter contacting said resulting solution with comminuted chitin, subsequently agitating said solution, thereafter separating the solution from the chitin, and finally incinerating the chitin to produce an ash containing a portion of said plutonium.

* * * * *